United States Patent [19]
Sakai

[11] Patent Number: 5,333,310
[45] Date of Patent: Jul. 26, 1994

[54] DATA MANAGEMENT METHOD AND SYSTEM

[75] Inventor: Naofumi Sakai, Yokohama, Japan

[73] Assignee: Hitachi, Ltd., Tokyo, Japan

[21] Appl. No.: 528,726

[22] Filed: May 24, 1990

[30] Foreign Application Priority Data

May 30, 1989 [JP] Japan ................... 1-137161

[51] Int. Cl.$^5$ .................. G06F 13/00; G06F 15/16
[52] U.S. Cl. ..................... 395/600; 395/650; 364/962.1; 364/963; 364/969.2
[58] Field of Search .......... 395/650, 700, 600

[56] References Cited

U.S. PATENT DOCUMENTS

| | | | |
|---|---|---|---|
| 4,498,145 | 2/1985 | Baker et al. | 364/900 |
| 4,635,189 | 1/1987 | Kendall | 364/200 |
| 4,648,036 | 3/1987 | Gallant | 364/300 |
| 4,686,620 | 8/1987 | Ng | 395/600 |
| 4,751,702 | 6/1988 | Beier et al. | 364/200 |
| 4,817,050 | 3/1989 | Komatsu et al. | 364/900 |
| 4,953,122 | 8/1990 | Williams | 395/400 |
| 4,965,719 | 10/1990 | Shoens et al. | 395/650 |
| 5,193,162 | 3/1993 | Bordsen et al. | 395/425 |

OTHER PUBLICATIONS

An Introduction to Database Systems, Addison-Wesley Publishing Corp. Inc. 1990; pp. 409–417.
C. J. Date, "Chapter 18 Recovery and Concurrency", An Introduction to Database Systems, vol. I, 4th Edition, published by Addison-Wesley Publishing Company, pp. 413–459.
Ilso Ahn, "Towards an Implementation of Database Management Systems with Temporal Support", Proc. of the International Conference on Data Engineering, IEEE, 1986, pp. 374–381.
James Clifford, et al., "Formal Semantics for Time in Databases", ACM Transactions on Database Systems, vol. 8, No. 2, Jun. 1983, pp. 214–254.
Daniel R. Ries, et al., "Effects of Locking Granularity in a Database Management System", ACM Transactions on Database Systems, vol. 2, No. 3, Sep. 1977, pp. 233–246.

Primary Examiner—Gareth D. Shaw
Assistant Examiner—John Q. Chavis
Attorney, Agent, or Firm—Fay, Sharpe, Beall, Fagan, Minnich & McKee

[57] ABSTRACT

A data management method and system for classifying shared data as new data or past data where the new data may be updated by processing and the past data may not be updated by processing. The data management method and system has a concurrency control, a central control and a sharing of data by a plurality of users wherein the past data is no subject to updating hereby precluding the need for lock processing by concurrency control of past data. In addition, together with query language, the capability of processing new and past data separately allows for an increase of concurrency control efficiency and a smoother user operation.

9 Claims, 4 Drawing Sheets

FIG. 3

DATA MANAGEMENT METHOD AND SYSTEM

BACKGROUND OF THE INVENTION

1. Field of the Invention

The present invention relates to a database management system (hereafter referred to as DBMS) in a database system. In particular the present invention relates to a data management method or system suitable for an operational environment where concurrency control is needed and where there is a mixture of data which can be updated and data which cannot be updated such as a mixture of new and past data.

2. Description of the Prior Art

Conventional database management systems employ data management methods or systems like those described below.

(i) In an environment where more than one user has access to shared data and in which the shared data is to be updated, special care must be taken to protect the data so that it is consistently structured as data of a database. In other words, care should be taken to avoid lockup or update errors which can occur when two or more users are simultaneously updating the same data.

To meet such requirements, concurrency control is needed as explained in Chapter 18 of "An Introduction to Database System" by C. J. Date, Addison-Wesley, vol. 1, 4th ed. In most cases, moreover, the concurrency control is made possible by a process called lock which restricts the sharing of data during the execution of update processes.

Chapter 19 of the above reference also describes a database description language called SQL (See Chapter 19 of the above reference) which, through the GRANT and REVOKE operations along with the VIEW condition, permits users to look up data while prohibiting data updating.

(ii) For data accessed by particular users only, it is not necessary to apply concurrency control or lock. Such data can be managed by the system after users declare them private data during database definition.

Small-sized mass storage devices have been developed for the above database. For instance, an optical disk is a small-sized mass storage device which can re-store the data that is stored in a magnetic disk which has been used widely. This re-storing of data is conditioned on frequent use by a user. For a description of optical disks, refer to "Hikari-Kioku-Sochi" by Doi Takashi et al., Hitachi-Hyoron, vol. 66, no. 8, 1984.

In the past, after data updating in a database system, users have never looked up the original data.

Therefore, after data is updated in the DBMS of a conventional database system, the original data was retained only for a short time so that it can be recovered when a failure occurs.

However, as the number of DBMS applications increases today, users' requirements for DBMSs are becoming more varied. One is the request to leave original data as past data for reference after updating. Today users are always updating the latest data (data created by the last updating operation) which causes an increase in original data stored as past data or reference data.

Any measures taken for the situation with conventional DBMSs cannot avoid controlling all data uniformly without separating past data from new data, because they only add different data to past data.

As far as query language and storage structure are concerned, the separation of new from past data may be recognized in methods such as those described in the following references: Ahn, I. Towards an Implementation of Database Management System with Temporal Support, Proc of the Int'l Conf. on Data Engineering, IE³, 1986. Clifford, T., et al., Formal Semantics for Time in Databases, ACM TODS, Vol. 8, No. 2, 1983.

But while original data after updating continue to be stored as past data, users only look up past data and do not update past data. This does not require either a concurrency control or lock.

In conventional DBMSs, as described earlier, all data is managed uniformly without separating past from new data. Therefore an unnecessary lock process is applied to shared past data which has no possibility of being updated, resulting in meaningless overhead.

To address the problem using conventional DBMS functions, a user inevitably performs operations such as GRANT and REVOKE, as described above, each time past data is added to memory after updating; however, this approach is not feasible at all. Furthermore, in the above noted method of recognizing the separation of new from past data, employed in query language and storage structure, an unnecessary lock process is applied to shared past data which has no possibility of being updated.

As described above, re-storing in a first storage medium the data that is stored in a second storage medium is implemented by a user's direct operation. The operation needs to be direct because it is not known in advance which data should be re-stored nor when the re-storing should be conducted.

SUMMARY OF THE INVENTION

It is the object of the present invention to provide a data management method or system which precludes the application of unnecessary lock processes to shared past data which is not subject to update processing thus making concurrency control more efficient by allowing more than one user to access shared past data, thereby boosting the processing capability of database systems.

A data management method or system embodying the present invention employs concurrency control, performs data management in a database system having central control and allows for a sharing of data. The above object of the present invention is achieved by classifying the data into data which can be updated and data which cannot be updated according to the conditions assigned to a given parameter and by automatically deciding that data should not be subjected to update processing if the data is classified as data which cannot be updated through the data is shared data. The following is an example of when the time axis is used for the above parameter:

(1) A data management method or system embodying the present invention has means to manage data by classifying it into new or past data according to time conditions. Wherefore, in a database system having a concurrency control section for central control and time sharing of series data, shared data classified as past data is automatically precluded from update processing while remaining concurrently accessible by a plurality of users.

(2) The past data, in a data management method or system embodying the present invention, is not subjected to concurrency control.

(3) Updating of the data classified as nonupdated data is inhibited while allowing the nonupdatable data to be read concurrently by multiple users.

(4) The above new data, in a data management method or system embodying the present invention, is automatically changed into past data after the occurrence of a specified event.

(5) The method or system, in a data management method or system embodying the present invention, furnishes an attribute for update possible and another attribute for update impossible according to the type of data, wherefore data furnished with the update impossible attribute is not subjected to concurrency control in a database system having a concurrency control section for central control and sharing of data.

(6) Past data and data which cannot be updated, in a data management method or system embodying the present invention, are re-stored automatically in another storage medium.

(7) Past data and data which cannot be updated, in a data management method or system embodying the present invention, are re-stored in another storage medium designated by a user.

(8) The automatic re-storing in another storage medium, in a data management method or system embodying the present invention, is performed every time past data or data which cannot be restored is generated.

(9) The automatic re-storing in another medium, in a data management method or system embodying the present invention, is performed every time the number of the above past data and/or the above data which cannot be updated reaches a certain amount.

(10) The automatic re-storing in another medium, in a data management method or system embodying the present invention, is performed at any specified time of day.

(11) The other storage medium noted above, in a data management method or system embodying the present invention, is not limited to a write-many-read-many (WMRM) storage medium; the system can also use a write-once-read-many (WORM) storage medium.

Therefore, in the present invention, the criterion for determining whether data should be regarded as past data at the time when their updating process is executed or at certain time of day is used to automatically decide that they should not be subjected to updating if the data is past data though the data is shared data at that time and later.

This automatic decision, that past data should not be subjected to updating, allows original data regarded as past data to be freed from the operation of lock, wherefore there is no need for an unnecessary application of lock to the original data.

In addition, the method of separating new from past data in query language and storage structure can be combined with that of separating new from past data to achieve concurrency control in order to facilitate concurrency control with the processing of new data separate from that of past data and query language in such a way as to satisfy users' operational requirements.

At certain time of day, specific data is changed into past data automatically, and past data is generated in response to an update operation of a user.

In addition, the criterion for deciding that data should or should not be subjected to updating is related to a certain time of day or the time when a certain operation is performed. This information can be used to determine which data to re-store and when to conduct the re-storing.

In other words, past data should only be restored in response to some trigger such as an update operation of a user, an accumulation of a specific amount of past data at a certain time of day. Needless to say, the storage medium that re-stores past data which cannot be updated can be either a WMRM storage or a WORM storage.

As described so far, the management of time series data by classifying them into new and past data according to time conditions and the automatic decision that some of them be not subjected to updating if they are past data even though shared leads to a more efficient concurrency control and thus boosts the performance of database systems.

The foregoing and other objects, advantages, manner of operation and novel features of the present invention will be understood from the following detailed description when read in connection with the accompanying drawings.

BRIEF DESCRIPTION OF THE DRAWINGS

In the drawings which illustrate embodiments of the present invention.

DETAILED DESCRIPTION OF THE PREFERRED EMBODIMENT

The following is the embodiments of the present invention described in detail referring to the drawing.

Figure 1:
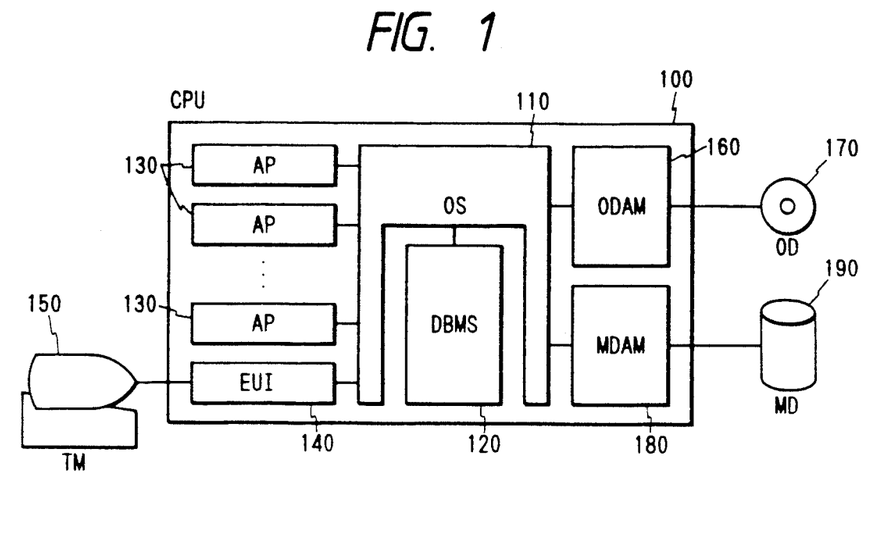
FIG. 1 is a schematic representation illustrating a database system implemented with the present invention.

FIG. 1 is an overall schematic representation illustrating a system implemented with the present invention. The operating system (hereinafter referred to as OS) 110, which controls the whole system, operates on a central processing unit (hereafter CPU) 100. Data is processed by a DBMS 120 in response to requests from an application program (hereafter AP) 130 and requests from users via an end user interface (hereafter EUI) 140 and a terminal (hereafter TM) 150.

In the embodiment, a magnetic disc (hereafter MD) 190 is used as a secondary storage device mainly for the data before updating. An optical disk (hereafter OD) 170 shall be used as a secondary storage device for the data which cannot be updated. To access the MD 190 and the OD 170, a magnetic disk access method (hereafter MDAM) 180 and an optical disk access method (hereafter ODAM) 160 are used respectively as data management programs.

Every time a user needs to look up data, the time of day and data name is specified as "Display data $d_1$ at time $t_1$.". But time may be omissible, and data shall be regarded as new data if its time is omitted.

Every time a user needs to update data, only the data name and the values after updating shall be specified as "Change the value of data $d_0$ into v.". Updating shall be limited to new data.

Figure 2:
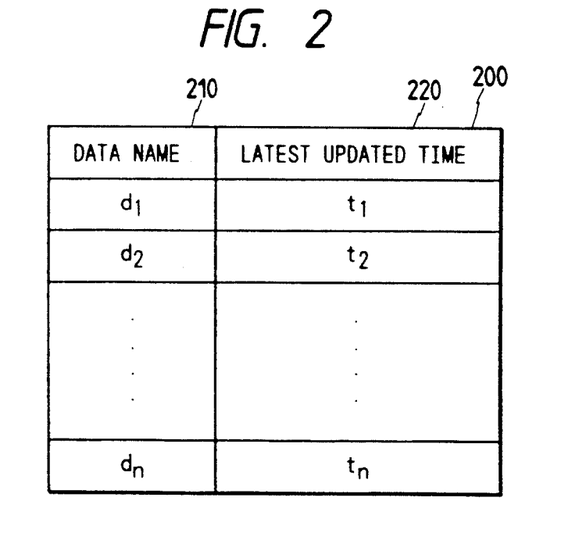
FIG. 2 is a data structure illustration depicting an example of a data structure for the information created, referred to and updated by the DBMS 120 in FIG. 1.

For the purpose of embodying the present invention, an example of a data structure for the information created, referred to and updated by the DBMS 120 is shown in a table 200 in FIG. 2. The table 200 comprises a data name column 210 which is a list of data names in the database and a latest updated time column 220 which indicates the last time when each piece of data is updated.

Figure 3:
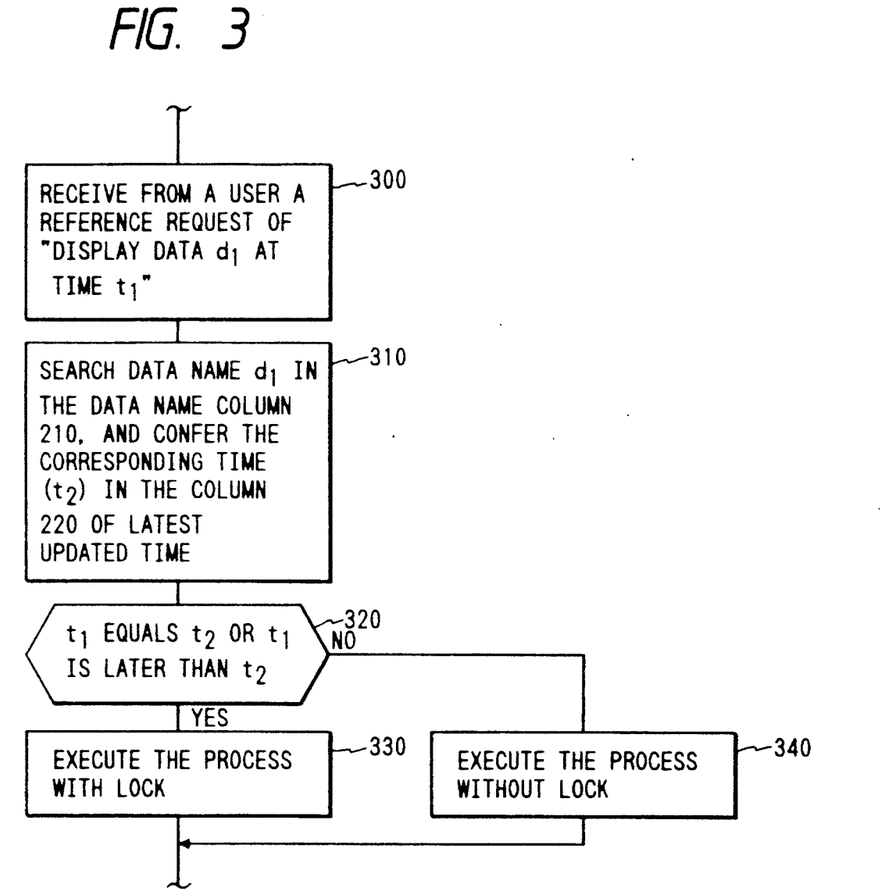
FIG. 3 is a flowchart illustrating the data reference operation of the DBMS 120 in FIG. 1.
Figure 4:
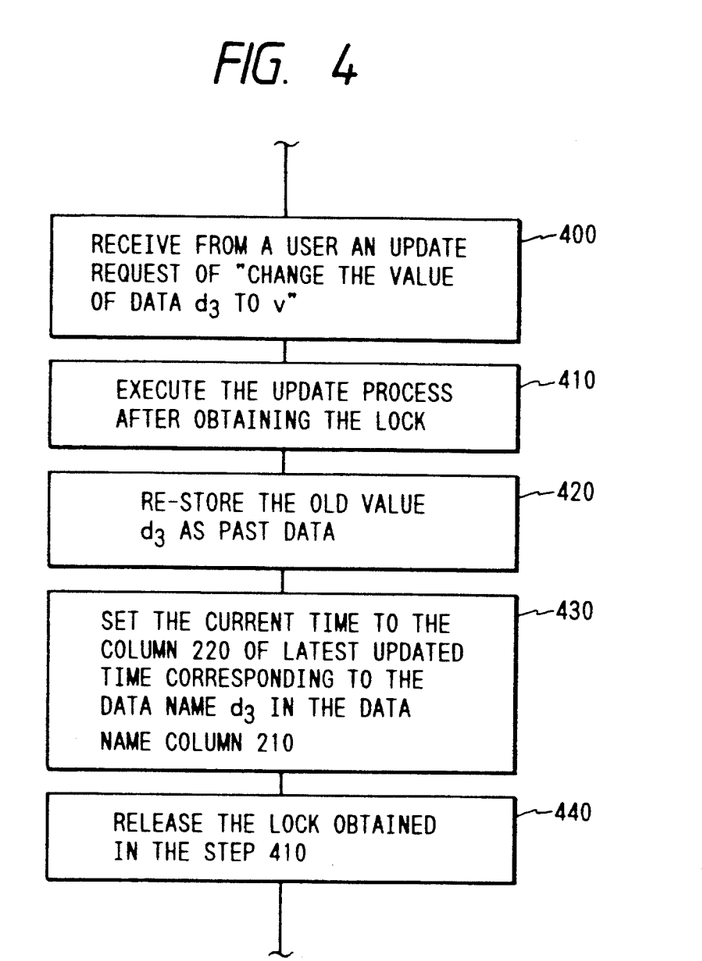
FIG. 4 is a flowchart illustrating the data update operation of the DBMS 120 in FIG. 1.

The two flows of the data reference process and the data update process by the DBMS 120 are shown in FIG. 3 and FIG. 4 respectively.

Referring to FIG. 3, the DBMS 120 receives from a user a look-up request 300, "Display data $d_1$ at time $t_1$.". After step 300, the DBMS searches the data name column 210 for data name $d_1$ and refers to the corresponding time ($t_2$) in the latest updated time column 220 (at the step 310). Then, the DBMS executes the process with conventional lock if $t_1$ equals $t_2$ or if $t_1$ is later than $t_2$ (at the step 330), or executes the process without lock if $t_1$ is earlier than $t_2$ (at the step 340). The lock application is not necessary when $t_1$ is earlier than $t_2$ because the value of data $d_1$ at time $t_1$ cannot be updated since it is past value if $t_1$ is earlier than $t_2$.

Referring now to FIG. 4, there is a step 400 where the DBMS 120 receives from a user an update request, "Change the value of data $d_3$ into v." After the step, the DBMS applied a conventional lock and executes the specified update process (at the step 410). Note that the old value of data $d_3$ needs to be re-stored as past data (at the step 420). At the moment, if the re-storing of the past data copied from the MD 190 in the OD 170 is already designated, the OD 170 and not the MD 190 re-stores past data. In addition, the DBMS sets the current time to the latest updated time column 220 corresponding to the date name $d_3$ in the data name column 210 (at the step 430). This can be performed using the timer function generally incorporated in the OS 110.

Finally, the DBMS releases the lock which was applied at the above step 410 (at the step 440), and finishes the process which was started in response to the update request from a user and received by the DBMS at the above step 400.

Incidentally, in the table 200 in FIG. 2, the data names in the data name column 210 and the latest updated time in the latest updated time column 220 are not necessarily the smallest units of data name and latest updated time respectively. When data names are managed in larger units, (units of tables in a relational database) during the processing of small data included in such large units, e.g., rows in a relational database, the procedure depicted in FIGS. 3 and 4 needs to be repeated for every large unit (table). Therefore, if lock application situations are needed, the portion of data not requiring a lock are locked nonetheless, as is often the case with conventional DBMSs. When $t_1$ equals $t_2$ at the step 320 in FIG. 3, the unit of latest updated time is large, therefore, it is required that each piece of data should be classified when past data is required to be stored.

The embodiment makes efficient concurrency control possible by separating new data from past data according to their time conditions. Moreover, if the re-storing of past data in the OD 170 has been designated, this re-storing can be conducted at the step 420 during updating.

The present invention raises processing efficiency by storing data in more than one disk allowing for parallel disk access associated with look-up requests from more than one user. The method can utilize the process of the present invention in which data in a storage medium are re-stored in another storage medium. The same process of the present invention can also be used to raise processing efficiency when a user requests to look up the entire history of some data. If the entire history is stored in one disk, the history data in the disk needs to be entered into a CPU piece by piece. But if the history data has been distributed to more than one disk, a possible result of the present invention, the reading of data in a disk can be processed at the same time the CPU processes a request to enter data into another disk, resulting in parallel processing which raises the processing efficiency and reduces user burden.

In the DBMS which incorporates the method of the present invention, since the past data created by updating is stored as past data sequentially from the beginning of free space, exclusive control is not needed in the storage where past data is stored if there is neither reorganization among past data nor reloading of them.

For the above noted classification into new and past data, there can be another method of using a special bit when original data is changed into past data. Still another method can be conceived in which there is an attribute for update possible and another for update impossible prepared in advance according to the type of data and data has its attribute for update possible changed into an attribute for update impossible when it changes from new data into past data.

The notable advantage of the latter method using an attribute for update possible and for update impossible is that it is realizable by declaring such data as cannot be updated since database creation data not possible to update to point out operational errors of the above noted GRANT or REVOKE if any and to reject a request to update data which cannot be updated.

Figure 5:
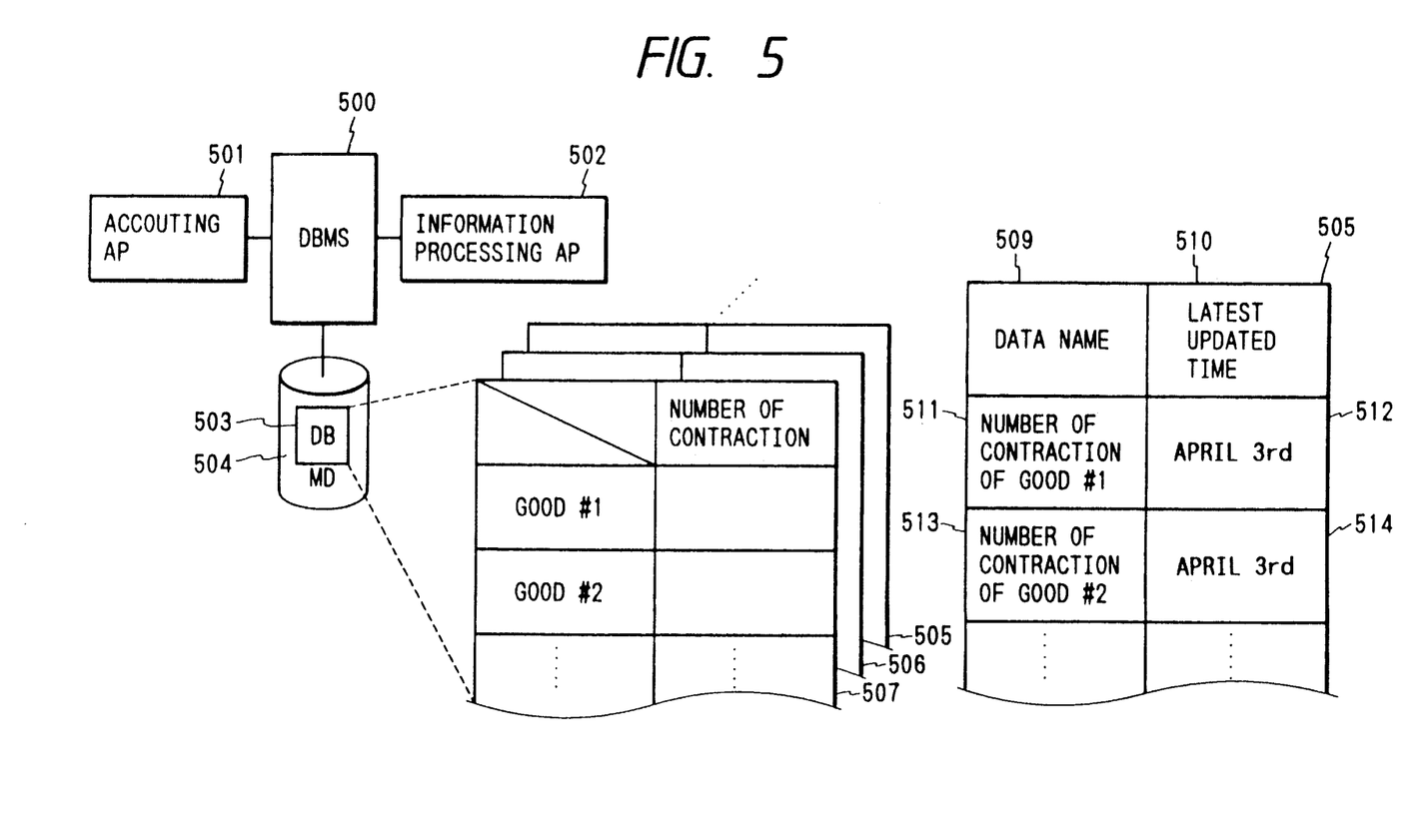
FIG. 5 is an illustration of an embodiment of the present invention.

The following is the description of how the method of the present invention is applied to actual business operations in reference to FIG. 5, an illustration of an embodiment of the present invention.

In general, the business in banks and securities companies is divided into two categories. One is the accounting business for transactions with customers, and the other is the information processing business for such activities as formulating strategies for the future on the basis of the performance of the above accounting business and current economic conditions. In FIG. 5, the application for the former business is represented as accounting AP 501, and that for the latter as information processing AP 502. For the AP 501 and the AP 502, a DB 503 in a magnetic disk MD 504 is used via a DBMS 500. Each of the AP 501 and the AP 502 corresponds to the AP 130 and the MD 504 and the DBMS 500 correspond to the MD 190 and the DBMS 120, both in FIG. 1 respectively. In FIG. 5, that which corresponds to the CPU 100 and the OS 110 is omitted for simplicity. The DB 503 is composed of the data 505 on April 1, the data 506 on April 2, the data 507 on April 3, etc. Note that the current date is April 3, the data 507, data 506 and 505 are new data and past data respectively. The table 508 has these items in its latest updated time column corresponding to items in the table 200: April 3, the item 512 and April 3, the item 514 for the number of contracts for goods #1 511 and the number of contracts for goods #2 513 both in the data name column 509 respectively.

In the embodiment in FIG. 5, updating can be performed only when the accounting AP 501 requests to update the new data 507 in the DB 503. The information processing AP 502 has no possibility of requesting update and is only likely to request to refer to any of the pieces of data, 505, 506 and 507.

Referring to the noted flowcharts shown in FIGS. 3 and 4, three examples of how requests are processed is described below: the request of the accounting AP 501 to update the data 507, the request of the information processing AP 502 to refer to the data 507 and the request of the information processing AP 502 to refer to the data 506.

The following describes request of the accounting AP 501 to update the data 507. For instance, when a new contract is made, the accounting AP 501 requests the DBMS 500 to add 1 to the number of contracts for goods #1 in the data 507 (which corresponds to the step 400). The DBMS 500 applies lock to the data 507 and executes the update process (which corresponds to the step 410). Then, the old number of contracts for goods on April 3 is re-stored as past data (which corresponds to the step 420), and April 3 is set to that item 512 in the latest updated time column 510 which corresponds to the number of contracts for goods #1 511 in the data name column 509 (which corresponds to the step 430). Finally, the lock which has been applied to the data 507 is released (which corresponds to the step 440).

The above example describes the processing for the request of the accounting AP 501 to update the data 507. However, in the above example, the unit, of latest updated time, is one day which is a large unit. The value of the item 512 is also April 3, and the value is the same both before and after the updating.

Incidentally, it is possible to lessen the required storage capacity and simplify the processing by storing old data before updating as past data by overwriting one piece of old data with another piece sequentially if they all correspond to the same date.

The following describes the request of the information processing AP 502 to refer to the data 507. When the DBMS 500 receives the request to display the number of contracts for goods #1 on April 3 which is assumed to be $t_1$ (which corresponds to the step 300), the DBMS 500 searches the data name column 509 for a data name, the number of contracts for goods #1 511 and refers to the corresponding time (April 3 = $t_2$) in the latest updated time column 510 (which corresponds to the step 310). Then the DBMS checks which is earlier, $t_1$ = April 3 or $t_2$ = April 3 (which corresponds to the step 320). But in this example $t_1$ equals $t_2$, so the DBMS executes the process with conventional lock (which corresponds to the step 330).

The following describes the request of the information processing AP 502 to refer to the data 506. When the DBMS 500 receives the request to display the number of contracts for goods #1 on April 2 which is assumed to be $t_1$ (which corresponds to the step 300), the DBMS 500 searches the data name column 504 for a data name, the number of contracts for goods #1 511 and refers to the corresponding time (April 3 = $t_2$) in the latest updated time column 510 (which corresponds to the step 310). Then the DBMS checks which is earlier, $t_1$ = April 2 or $t_2$ = April 3 (which corresponds to the step 320). But in this example $t_1$ is less than $t_2$, so the DBMS executes the process without lock (which corresponds to the step 340).

So far, the construction and the manner of operation of the present invention have been described. In these descriptions, an attribute for update possible and another for update impossible are specified according to a time factor, namely, whether data is new or past. However, the present invention is not limited to such time factors. The method of the present invention by which the separation of data which can be updated from data which cannot leads to higher efficiency of concurrency control and can utilize criteria such as spatial parameters other than time.

For example, the method of the present invention can be used for recording topographical data. Land data can be updated when a change of elevation occurs due to the earth's crustal disturbances. Concurrency control efficiency can be boosted by checking the possibility and impossibility of updating land and the sea data according to longitude and latitude, since data in connection with the sea can be handled without lock application and processed the same way as noted above. Needless to say, topography (shorelines) can also change with time. Therefore, the topographical database in each period can use a combination of time and topography criterion to gain higher efficiency of concurrency control.

The effect of the embodiment is evaluated below by assuming a suitable model. There is a reference useful for such evaluation: "Effects of Locking Granularity in a Database Management System" by Ries, D. R. and Stonebraker, M., ACM TODS Vol. 2, No. 3, Sep., 1977. This shows a model of a database system in the multi-user environment where parallel updating is performed, and a simulation of the performance of exclusive control of granularity (the size of the above division) to various degrees for the case where the data for lock are processed by dividing them. The Table II in the reference shows the I/O time spent on processes other than lock (usefulio), the I/O time spent on lock processes (lockio), CPU time spent on processes other than lock (usefulcpu) and CPU time spent on lock processes (lockcpu) all within a certain period of time in connection with granularity from 1 to 5000.

The result of evaluating the performance of the above embodiment on condition of this model is shown in Tables 1 to 3. Table 1, Table 2 and Table 3 show the case where past data totals 50%, 90% and 99% of all the data respectively. Since the method of the present invention makes lock processes unnecessary for past data, lockio and lockcpu are lockio/2 and lockcpu/2 respectively in Table 1 (50%), are lockio/10 and lockcpu/10 respectively in Table 2 (90%) and are lockio/100 and lockcpu/100 respectively in Table 3 (99%). In addition, each table shows the ratios:

$$\frac{\text{Usefulio + Lockio after improvement}}{\text{Usefulio + Lockio}}$$

and $$\frac{\text{Usefulcpu + Lockcpu after improvement}}{\text{Usefulcpu + Lockcpu}}$$

which give the degree to which all I/O time and all CPU time, including lock processes, are improved by the method of the present invention.

As shown in those results, past data has a high proportion both for all I/O time and all CPU time. As granularity increases, performance can improve to about 63% for all I/O time and about 26% for all CPU time.

This result has been obtained when the time for lock processes for I/O time and CPU time is reduced in accordance with the proportion of past data to all data.

TABLE 1

| | lockio/2 | $\frac{usefulio + (lockio/2)}{usefulio + lockio}$ | lockcpu/2 | $\frac{usefulcpu + (lockcpu/2)}{usefulcpu + lockcpu}$ |
|---|---|---|---|---|
| 1: | 641.000 | 0.923 | 6.410 | 0.996 |
| 2: | 485.000 | 0.948 | 4.850 | 0.998 |
| 3: | 388.500 | 0.960 | 3.885 | 0.998 |
| 4: | 335.500 | 0.965 | 3.355 | 0.999 |
| 5: | 302.000 | 0.969 | 3.020 | 0.999 |
| 7: | 237.000 | 0.976 | 2.370 | 0.999 |
| 9: | 214.000 | 0.978 | 2.140 | 0.999 |
| 10: | 218.500 | 0.978 | 2.185 | 0.999 |
| 15: | 201.500 | 0.979 | 2.605 | 0.999 |
| 20: | 198.000 | 0.980 | 2.640 | 0.999 |
| 30: | 185.500 | 0.981 | 3.360 | 0.999 |
| 40: | 180.000 | 0.982 | 3.950 | 0.998 |
| 50: | 180.000 | 0.982 | 4.395 | 0.998 |
| 75: | 227.000 | 0.977 | 6.645 | 0.997 |
| 100: | 241.000 | 0.976 | 7.715 | 0.997 |
| 125: | 273.500 | 0.972 | 10.445 | 0.996 |
| 150: | 309.000 | 0.969 | 11.850 | 0.995 |
| 200: | 376.500 | 0.962 | 15.000 | 0.993 |
| 250: | 403.000 | 0.959 | 18.370 | 0.992 |
| 300: | 507.500 | 0.948 | 21.735 | 0.990 |
| 500: | 695.000 | 0.930 | 34.750 | 0.984 |
| 750: | 975.000 | 0.900 | 47.220 | 0.977 |
| 1000: | 1231.000 | 0.875 | 61.549 | 0.968 |
| 2500: | 2412.000 | 0.748 | 120.600 | 0.916 |
| 5000: | 3060.000 | 0.679 | 152.999 | 0.865 |

TABLE 2

| | lockio/10 | $\frac{usefulio + (lockio/10)}{usefulio + lockio}$ | lockcpu/10 | $\frac{usefulcpu + (lockcpu/10)}{usefulcpu + lockcpu}$ |
|---|---|---|---|---|
| 1: | 128.200 | 0.861 | 1.282 | 0.993 |
| 2: | 97.000 | 0.907 | 0.970 | 0.996 |
| 3: | 77.700 | 0.928 | 0.777 | 0.997 |
| 4: | 67.100 | 0.938 | 0.671 | 0.997 |
| 5: | 60.400 | 0.945 | 0.604 | 0.998 |
| 7: | 47.400 | 0.957 | 0.474 | 0.998 |
| 9: | 42.800 | 0.961 | 0.428 | 0.998 |
| 10: | 43.700 | 0.960 | 0.437 | 0.998 |
| 15: | 40.300 | 0.963 | 0.521 | 0.998 |
| 20: | 39.600 | 0.964 | 0.528 | 0.998 |
| 30: | 37.100 | 0.966 | 0.672 | 0.997 |
| 40: | 36.000 | 0.967 | 0.790 | 0.997 |
| 50: | 36.000 | 0.967 | 0.879 | 0.997 |
| 75: | 45.400 | 0.959 | 1.329 | 0.995 |
| 100: | 48.200 | 0.956 | 1.543 | 0.994 |
| 125: | 54.700 | 0.950 | 2.089 | 0.992 |
| 150: | 61.800 | 0.944 | 2.370 | 0.991 |
| 200: | 75.300 | 0.932 | 3.000 | 0.988 |
| 250: | 80.600 | 0.927 | 3.674 | 0.986 |
| 300: | 101.500 | 0.907 | 4.347 | 0.982 |
| 500: | 139.000 | 0.874 | 6.950 | 0.971 |
| 750: | 195.000 | 0.820 | 9.444 | 0.958 |
| 1000: | 246.000 | 0.774 | 12.310 | 0.943 |
| 2500: | 482.400 | 0.547 | 24.120 | 0.048 |
| 5000: | 612.000 | 0.422 | 30.600 | 0.756 |

TABLE 3

| | lockio/100 | $\frac{usefulio + (lockio/100)}{usefulio + lockio}$ | lockcpu/100 | $\frac{usefulcpu + (lockcpu/100)}{usefulcpu + lockcpu}$ |
|---|---|---|---|---|
| 1: | 12.820 | 0.848 | 0.128 | 0.993 |
| 2: | 9.700 | 0.897 | 0.097 | 0.995 |
| 3: | 7.770 | 0.921 | 0.078 | 0.997 |
| 4: | 6.710 | 0.932 | 0.067 | 0.997 |
| 5: | 6.040 | 0.939 | 0.060 | 0.997 |
| 7: | 4.740 | 0.953 | 0.047 | 0.998 |
| 9: | 4.280 | 0.957 | 0.043 | 0.998 |
| 10: | 4.370 | 0.956 | 0.044 | 0.998 |
| 15: | 4.030 | 0.959 | 0.052 | 0.998 |
| 20: | 3.960 | 0.960 | 0.053 | 0.998 |
| 30: | 3.710 | 0.963 | 0.067 | 0.997 |
| 40: | 3.600 | 0.964 | 0.079 | 0.997 |
| 50: | 3.600 | 0.964 | 0.088 | 0.996 |
| 75: | 4.540 | 0.955 | 0.133 | 0.994 |
| 100: | 4.820 | 0.952 | 0.154 | 0.993 |
| 125: | 5.470 | 0.945 | 0.209 | 0.991 |
| 150: | 6.180 | 0.938 | 0.237 | 0.990 |

TABLE 3-continued

|  | lockio/100 | $\frac{\text{usefulio} + (\text{lockio}/100)}{\text{usefulio} + \text{lockio}}$ | lockcpu/100 | $\frac{\text{usefulcpu} + (\text{lockcpu}/100)}{\text{usefulcpu} + \text{lockcpu}}$ |
|---|---|---|---|---|
| 200: | 7.530 | 0.925 | 0.300 | 0.987 |
| 250: | 8.060 | 0.920 | 0.367 | 0.984 |
| 300: | 10.150 | 0.897 | 0.435 | 0.981 |
| 500: | 13.900 | 0.861 | 0.695 | 0.968 |
| 750: | 19.500 | 0.802 | 0.444 | 0.954 |
| 1000: | 24.620 | 0.752 | 1.231 | 0.937 |
| 2500: | 48.240 | 0.502 | 2.412 | 0.833 |
| 5000: | 61.200 | 0.364 | 3.060 | 0.732 |

According to the present invention, since past data can be regarded as data not subjected to updating and thus cannot be processed by lock mechanism, it is possible to achieve a more efficient concurrency control. Moreover, since the method of achieving concurrency control at the same time as managing new and past data separately is combined with the method of recognizing the separation of new from past data in query language or storage structure, more efficient concurrency control can be implemented and smoother operation can be ensured for users. In addition, past data created in time of updating can be re-stored in another storage medium other than the one in which it was originally stored, without burdening users which allows for a more efficient concurrency control when a plurality of users access shared data.

As described above, the management of data as data which cannot be updated based on their time conditions leads to freeing the data from concurrency control and thus helps to make more efficient concurrency control possible and to boost processing performance of database systems.

What is claimed is:

1. In a computer system having a database management computer system, a computer memory means, and an access control means which performs a concurrency control function for non-interfering sharing of data by a plurality of users, a data management method comprising the steps of:

storing a plurality of shared data records in the memory means, each record stored in conjunction with (i) a data name and (ii) a time parameter corresponding to the data name which are stored in the memory means;

setting in said database management computer system a time condition as a set time condition threshold for classifying data;

with the database management computer system, in response to access requests comparing the time parameter corresponding to a data name of each requested record with said set time condition threshold to classify the shared data record as one of (1) past data or (2) latest data in accordance with the comparison of the corresponding time parameter and the set time condition threshold;

storing the shared data records classified as past data nd the shared data records classified as latest data in a past data storage portion of the memory means and a latest data storage portion of the memory means, respectively; and with the access control means, unlocking the shared data records classified as past data from the concurrency control function and allowing said past data records to be read from the past data storage portion of the memory means concurrently by said plurality of users without performance of the concurrency control function.

2. A data management method according to claim 1, wherein the set time condition is a predetermined time such that the shared data classified as the latest data become classified as past data after the predetermined time.

3. A data management method according to claim 1, wherein the set time condition is an occurrence of a predetermined event such that the latest data become past data with the occurrence of the predetermined event.

4. A data management method according to claim 1 further comprising: with the database management computer system, moving latest data which is reclassified as past data from the latest data portion of the memory means to the past data storage portion of the memory means.

5. A data management method according to claim 4 further including a step of:

with the database management computer system, moving latest data into the past data storage portion of the memory means in response to a quantity of said latest data reaching a predetermined quantity.

6. A data management method according to claim 4 wherein the step of moving the latest data to the past data storage portion of the memory means is executed at a predetermined time each day.

7. A data management method according to claim 4, wherein said past data storage portion of the memory means includes a write once read many times memory.

8. A data management method according to claim 1 further comprising: with the database management computer system, moving past data into the latest data storage portion of the memory means in response to a user's request received through the access control means.

9. A computer system comprising:

first electronic data storage means for storing a plurality of data which is shared by a plurality of users, each shared data being a record with (i) a data name and (ii) a corresponding time parameter;

access control means for enabling a plurality of concurrent users to concurrently request access by the data names to the records of the shared data for reading and updating the shared data, the access control means performing a concurrency control function to provide for non-interfering sharing of records from the first data storage means by the plurality of concurrent users;

means for setting a threshold time condition;

classifying means responsive to a record request for comparing the time parameters of the requested record from the first data storage means which corresponds to the data name of the requested record with the threshold time condition to classify the corresponding shared data of the requested record as one of (1) past data or (2) latest data;

second data storage means for storing the past data;

means for transferring a record of the data classified as past data from the first data storage means to the second data storage means, the second data storage means being accessible by the access control means; and means for inhibiting said users from updating the record of the past data, but allowing said past data to be read from the second data storage means concurrently by said plurality of users without the access means performing the concurrency control function.

* * * * *

UNITED STATES PATENT AND TRADEMARK OFFICE
CERTIFICATE OF CORRECTION

PATENT NO.  : 5,333,310
DATED       : July 26, 1994
INVENTOR(S) : Naofumi Sakai

It is certified that error appears in the above-indentified patent and that said Letters Patent is hereby corrected as shown below:

Claim 1, column 11, line 60, delete "nd" and substitute therefor --and--.

Signed and Sealed this

Twentieth Day of September, 1994

Attest:

BRUCE LEHMAN

*Attesting Officer*    *Commissioner of Patents and Trademarks*